(12) United States Patent
Paille, Jr.

(10) Patent No.: US 8,562,816 B1
(45) Date of Patent: Oct. 22, 2013

(54) TANK CLEANING SYSTEM AND APPARATUS

(76) Inventors: André Paille, Jr., Covington, LA (US); Bonnie Clair Atzenhoffer Paille, legal representative, Covington, LA (US)

(*) Notice: Subject to any disclaimer, the term of this patent is extended or adjusted under 35 U.S.C. 154(b) by 460 days.

(21) Appl. No.: 12/796,406

(22) Filed: Jun. 8, 2010

Related U.S. Application Data

(60) Provisional application No. 61/185,114, filed on Jun. 8, 2009, provisional application No. 61/352,218, filed on Jun. 7, 2010.

(51) Int. Cl.
   *C10M 141/10* (2006.01)

(52) U.S. Cl.
   USPC .......................................................... 208/13

(58) Field of Classification Search
   USPC .......................................................... 208/13
   See application file for complete search history.

(56) References Cited

U.S. PATENT DOCUMENTS

| | | |
|---|---|---|
| 2006/0035793 A1 | 2/2006 | Goldman |
| 2009/0152163 A1* | 6/2009 | Goldman ...................... 208/13 |

* cited by examiner

*Primary Examiner* — Brian McCaig

(57) ABSTRACT

A method for treating crude oil and petrochemical product tank bottoms treats the tank bottoms sludge with a paraffin modifier that converts the tank bottom sludge, in the presence of a hydrocarbon diluent (cutter stock) and heat, into three separate phases. The resulting three phase separation is stable enough that there is no need for the use of any mechanical equipment such as centrifuges or decanters to enhance the separation.

20 Claims, 2 Drawing Sheets

TANK CLEANING SYSTEM AND APPARATUS

CROSS-REFERENCE TO RELATED APPLICATIONS

Priority of my U.S. Provisional Patent Application Ser. No. 61/185,114, filed 8 Jun. 2009, incorporated herein by reference, is hereby claimed. Priority of my U.S. Provisional Patent Application Ser. No. 61/352,218, filed 7 Jun. 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to crude oil product recovery. More particularly, the present invention relates to a method for treating crude oil and refined products, tank bottoms, tank bottom treatment and inventory recovery system, utilizing an asphaltene and paraffin modifier.

2. General Background of the Invention

One of the most challenging issues at refineries, crude oil terminals and production sites is the development of new ways to minimize the cost for disposing of crude oil storage tank bottoms. Most crude oil tank bottom sludges contain high molecular weight hydrocarbons, such as paraffins and asphaltenes, water and inorganic solids. The inorganic solids are typically sand, rust and heavy metal oxides.

The most commonly used methods for cleaning these tanks involve various types of mechanical equipment in conjunction with water or hydrocarbon diluents. The mechanical equipment can be as diverse as centrifuges, liquid-solid separators, robotics and special mixers designed to slurry the tank bottom sludge with diluents. In most cases, the end result is to transport the recovered mixture of tank bottom sludge and diluent to one of three possible disposal systems, 1) land disposal site, 2) incineration and/or 3) heavy oil coker unit. These methods are inefficient, expensive and very time consuming.

HISTORY OF DEVELOPMENT

In 1987 the present inventor began a career in industrial services (tank cleaning). It was not long before the present inventor realized that the sludge remaining in most crude oil storage tanks were mostly hydrocarbons and lots of it. These crude oil tank bottoms at the time were not classified as hazardous waste and were not considered of value to recover. They could be disposed of in land farms or disposal facilities for minimum cost (@$20 a ton). Also at the time, crude oil was available for around $12-$15 a US barrel (42 gallons). The fact is that all of these non-renewable resources were being wasted and there was very little concern for the environment in these early years. Over the last 22 years of working with heavy paraffin crude oil bottoms, the present inventor has been able to develop an inventory recovery system to safely and successfully recover these valuable hydrocarbons. By doing so, we are able to obtain true waste minimization and inventory recovery. The average percentage of hydrocarbon recovered from heavy paraffin storage tanks is 96% of the total tank bottom. This leaves only 4% of BS&W (estimated 1% inorganic solid sand and rust and 3% water).

Industry Standards

1. In the industry, BS&W means bottom, sediment, and water. In most tanks, all the tank bottoms are waste with very little recoverable inventory.

2. In high paraffin storage tanks this does not apply. The average make-up of heavy crude oil tank bottoms is as follows:
   hydrocarbons=96%
   inorganic sand and rust=1%
   water=3%.

BRIEF SUMMARY OF THE INVENTION

The present invention is an improved version of the inventory recovery system developed by the present inventor over the previous 22 years.

The present invention includes a method for treating crude oil and refined products tank bottoms utilizing a tank bottom treatment and an inventory recovery system.

The method of the present invention solves the problems in the art in a simple and straightforward manner. What is provided is a novel method for treating crude oil and petrochemical product tank bottoms. The method treats the tank bottoms sludge with a paraffin modifier (preferably Malcera 508MM Paraffin Modifier, commercially available from Malcera LLC (www.malcera.com), and subject of Patent Publication No. US 2006/0035793) that converts the tank bottom sludge, in the presence of a hydrocarbon diluent (cutter stock) and heat, into three separate phases. The resulting three phase separation is stable enough that there is no need for the use of any mechanical equipment such as centrifuges or decanters to enhance the separation.

This process is possible because of the specific gravity of the paraffin when compared to water and solids. For example, the specific gravity of the elements are around the following: water-1 (one gallon of water weighs 8.34 pounds), light cycle oil (diesel)-0.87, paraffin-less than 1.0, and solids: about 3.5. The simple inventory recovery process of the present invention takes into consideration the nature of the paraffin and the specific gravities of the constituents of the tank bottoms and diluent. The reason centrifuges and the like cannot effectively recover the paraffin as inventory is because of the specific gravity and sensitivity to temperature of the paraffin.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
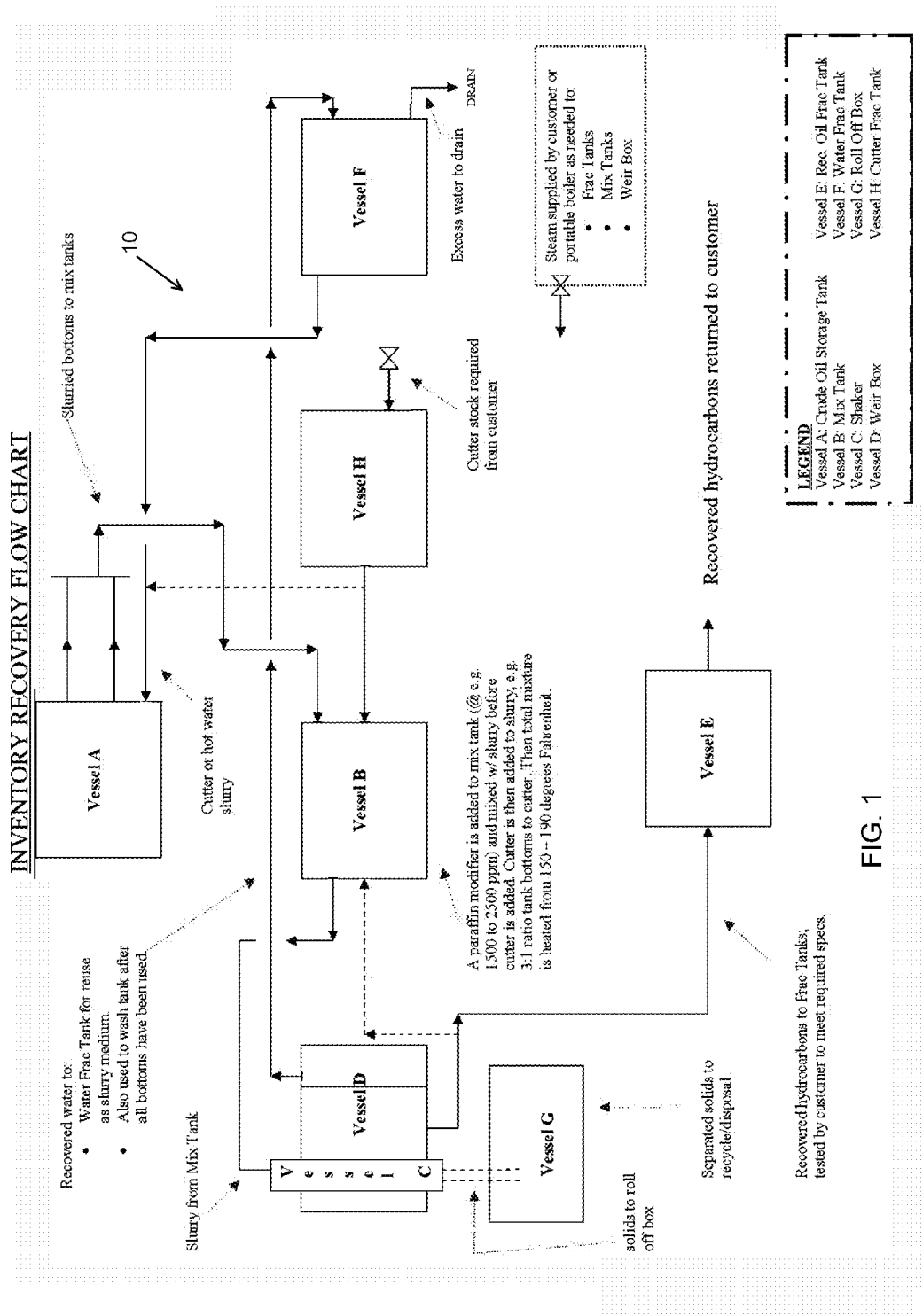
FIG. 1 is a flow chart illustrating a preferred method of the present invention.

FIG. 1 is a flow chart which illustrates a preferred method of the present invention using apparatus 10 of the present invention. The various vessels preferably used in the method are shown, while the pumps are not (though arrows indicate the flow of materials).

In FIG. 1, Vessel A is a crude oil storage tank. Vessel B is a mix tank for mixing tank bottoms from Vessel A with cutter stock stored in Vessel H and paraffin modifier (which is preferably a wax plasticizing and dispersing chemical). Vessel C is a shaker with a screen for capturing larger solids as the slurry moves from mix tank Vessel B to weir box Vessel D. Vessel E is a recovered hydrocarbons frac tank for receiving recovered hydrocarbons separated from water and solids in Vessels C and D. Vessel F is a water frac tank for receiving water separated from solids and hydrocarbons in Vessels C and D. Vessel G is a container for receiving solids separated from water and hydrocarbons in Vessel C.

Vessel A can be for example a standard oil storage tank used in the oil industry. It can be for example 100-315 feet in diameter and 40 feet high and have a capacity of about 2.3-23 million gallons-(55,000-555,000 barrels).

Vessel B can be for example a standard mix tank used in the oil industry, such as those commercially available from Del Corporation as 465 bbl mix tank which has a cap. It can have a capacity of 19,530 gallons (465 barrels).

Vessels E, F, and H can be for example standard frac tanks used in the oil industry, such as those commercially available from Tidal Tank Corporation as 21,000 gallon liquid storage tank (frac tank). These frac tanks preferably have some sort of heater to maintain their contents at a desired temperature. Although a single vessel of each type is shown in FIG. 1, there can be as many vessels of each type as necessary or desirable to handle the quantity of slurry to be processed.

Vessel G can be a standard roll-off container typically used in the oil field, such as those commercially available from Tidal Tank Corporation as roll-off containers with steam coils for heat.

Figure 2:
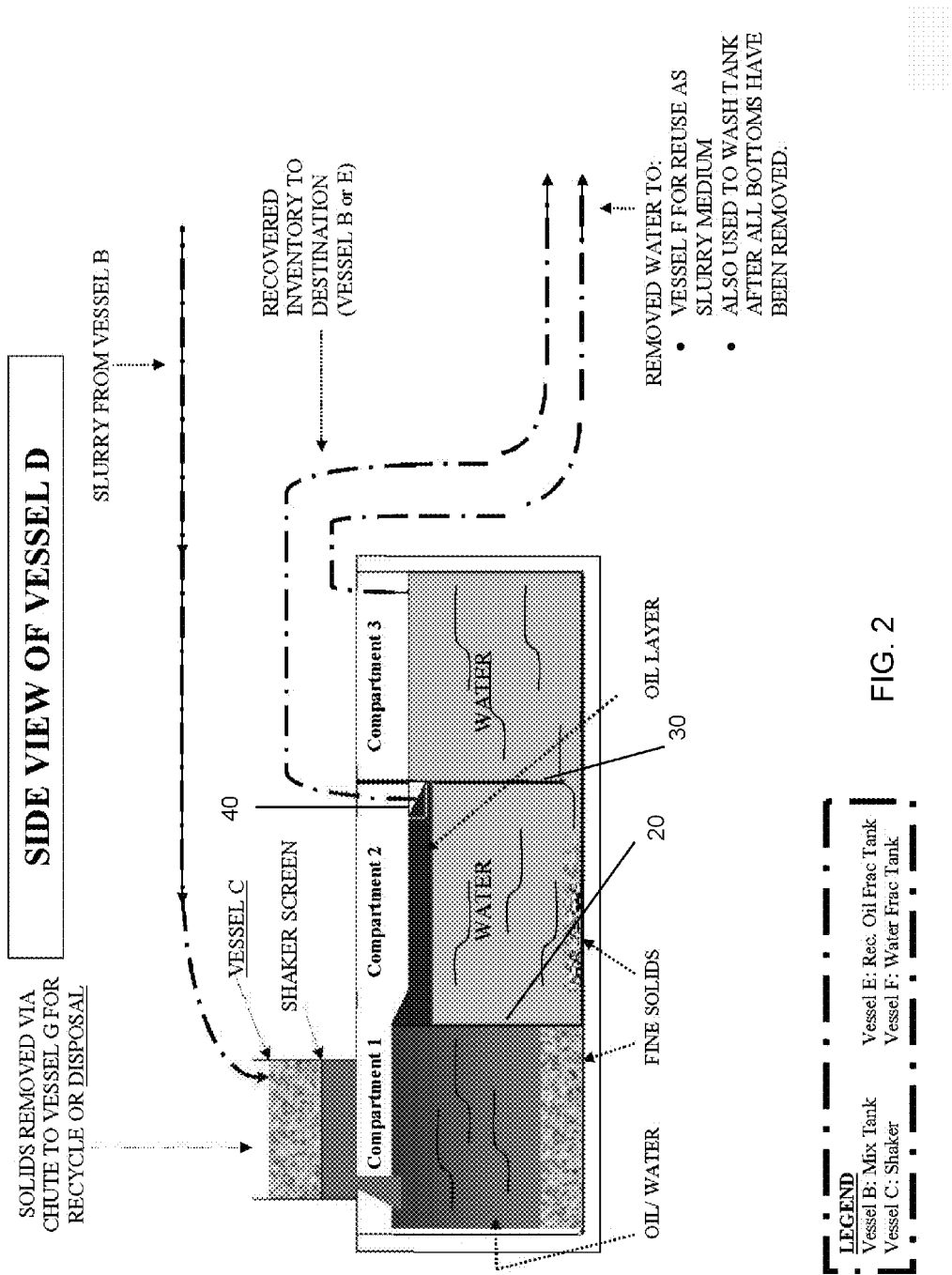
FIG. 2 is a schematic view of a preferred oil/water separator used in the present invention.

Vessel D is shown in side view in FIG. 2. Vessel D is positioned below Vessel C to receive fluid (water and hydrocarbons) which passes through the shaker screen in Vessel C.

The shaker screen in Vessel C can be for example 60 to 100 mesh.

Slurry from Vessel B is pumped to Vessel C. There can be for example an average 3:1 ratio of tank bottoms to cutter with 1500 ppm to 2500 ppm of paraffin modifier. The ratio could instead be anywhere from about an average of 5:1 to 1:1 tank bottoms to cutter. Also, more paraffin modifier could be used, but that would likely be wasteful (as it would not materially improve the results). Preferably, the mixture is heated to about 150 to 190 degrees Fahrenheit, though the method of the present invention can work at temperatures as low as about 140 degrees Fahrenheit and as high as about 200 degrees Fahrenheit Vessel D can be for example a 25 cubic yard open-top weir box. Vessel D as shown in FIG. 2 includes three compartments, designated in FIG. 2 as Compartment 1, Compartment 2, and Compartment 3. There is also a trough 40 and 3 inch air diaphragm pump (not shown) which receives hydrocarbons which flow from Compartment 2 on their way to Vessel E (preferably) or Vessel B (occasionally one would want to route the recovered hydrocarbons to Vessel B instead of Vessel E because adjustments need to be made to temperature and desired flow rate in order to maintain specification required for recovered hydrocarbons). This is required due to one of two reasons: a) reaching ideal condition during initial start up or b) periodic field test demonstrated need. The trough 40 which receives hydrocarbons which flow from Compartment 2 on their way to Vessels E or B preferably has an open top for receiving the hydrocarbons, four sides and a bottom (all of which are oil-tight and water-tight) and can have for example dimensions of 2 inches high by 87 inches long (width of inside of weir box) by 6 inches wide when Vessel D has a volume of 25 cubic yards.

Compartment 1 is separated from Compartment 2 by a solid oil-tight and water-tight wall 20 preferably made of 3/8 inch steel (but Vessel D could be made of varying width of steel from as small as for example 1/4 inch instead). Fluid flows from Compartment 1 to Compartment 2 by flowing over this wall. Compartment 2 is separated from Compartment 3 by a solid oil-tight and water-tight wall 30 preferably made of 3/8 inch steel. Fluid flows from Compartment 2 to Compartment 3 by flowing under this wall 30.

Preferably, the speed of the pump pumping slurry from Vessel B to shaker Vessel C is adjusted to maintain flow at approximately 100 horizontal inches in 15 seconds between Compartments 1 and 2 in Vessel D. In Compartment 1 (see FIG. 2), the temperature is raised and controlled at around 200 degrees Fahrenheit (preferably via steam coils—not shown), though the method of the present invention can work at temperatures as low as about 150 degrees Fahrenheit and as high as about 200 degrees Fahrenheit in Compartment 1.

In Compartment 2 (see FIG. 2) the water layer is preferably maintained at a maximum of 200 degrees Fahrenheit, though the method of the present invention can work with the water layer in Compartment 2 at temperatures as low as about 170 degrees Fahrenheit. The interface between water and oil is preferably maintained at about 170 degrees Fahrenheit (such as for example via steam coils-not shown), though the method of the present invention can work when the interface is at temperatures as low as about 150 degrees Fahrenheit and as high as about 200 degrees Fahrenheit.

In Compartment 3, preferably the temperature should never exceed 200 degrees Fahrenheit. Otherwise, the water flashes off and rises back up into the oil and is carried off. The method of the present invention can work with the water in Compartment 3 at temperatures as low as about 170 degrees Fahrenheit.

Though not shown in the figures, appropriate temperature gauges can be in thermal contact with each fluid whose temperature is preferably monitored and controlled, and appropriate mechanisms can be provided for controlling the temperature, preferably automatically.

It is preferred that the thickness of the oil layer in Compartment 2 be maintained at a maximum of about 1½ to 2 inch thickness because at this thickness the optimal separation occurs, any thicker and the hydrocarbon mixture begins to gel, not allowing the remaining water and fine inorganic solid to separate from the mixture. This can be achieved by adding water to and removing water from Vessel F as necessary. An indication that change in thickness of oil layer is occurring is a temperature change observed at the water and oil interface at Compartment 2.

Fine solids can be removed from Vessel D by slurrying it and pumping it back to the mix tank (Vessel B) and repeat the process, temporarily using a finer screen (150-200 mesh) on shale Shaker (Vessel C).

Steam can be supplied by the customer or by a portable boiler as needed to steam coils in the frac tanks, mix tanks, and weir box to maintain fluids at desired temperature levels.

Note 1: With this process, it is possible to recover 100 barrels (4200 gallons) of hydrocarbons per hour that have a BS&W spec of 1% or less using a weir box having a volume of 25 cubic yards (as shown in FIG. 2). This process can be scaled up (or down) to any size container.

Note 2: With this process, typically 99.99% of the total hydrocarbons that were present in the tank bottoms can be recovered.

Note 3: High paraffin crude can be more valuable than low paraffin crude, though it costs more to handle the high paraffin crude without the method of the present invention.

As disclosed herein, the process of the present invention involves two basic steps, which can for example be performed as follows (materials used can vary from the example set out below):

Step I:

The first step in the process is to get a representative sample of the hydrocarbons present in the storage tank and analyze it to establish criteria for performing the process. First, estimate the volume remaining in the storage tank to be cleaned. Next, take a representative core sample to establish what is in the storage tank. Then, take the representative core sample to the lab and perform the following experiment to determine if it is a candidate for the Inventory Recovery Process.

1. Preferred Materials:
800 ml beaker;
long thermometer;
Fisher hot plate;
magnetic stirring bar;
cutter (#2 diesel, for example);
Paraffin modifier (about 1500 parts per million, for example).

2. Setting up sample:
Stir representative sample in bucket.
Put 200 ml of representative sample in 800 ml beaker.
Mix in 0.3 ml of paraffin modifier with representative sample in beaker.
Mix in 200 ml of cutter (#2 diesel, for example).

3. Testing and heating sample:
Mix all ingredients in beaker while cold (room temperature) for 5 minutes.
Slowly heat solution.
Observe and record temperature when all paraffin is in solution (melted).
Continue to mix and heat solution; bring up to 200 degrees Fahrenheit and hold at temperature for 15 minutes.
Stop mixing.
Maintain temperature of mixture at around 200 degrees Fahrenheit for 30 minutes (may have to continually change heat).
Turn off heat and allow solution to settle until the next day.
Observe Solution: ml of each
Hydrocarbon-
Water-
Solids-
(If there is no water layer, add 200 mL of water and repeat Step 3: Testing and Heating Sample. This ensures a better observation of the ratio of hydrocarbons, water, and solids present).

Three physical observations of what the paraffin modifier accomplishes are as follows:
1. Modifies the crystal structure and allows the paraffin to suspend in the diluent.
2. Changes the properties of the mixture such as to be able to raise the temperature to 200 degrees Fahrenheit.
3. Helps in breaking any emulsions to enhance three phase separation.

Step II (Refer to FIG. 1):

The tank bottom sludges are pumped out of the storage tank (Vessel A) as a slurry in a mixture of sludge and hydrocarbon diluent into a mix tank (Vessel B). In the mix tank the sludge is treated with a wax plasticizing and dispersing chemical (preferably Malcera 508MM Paraffin Modifier, though one could use other wax plasticizing and dispersing chemicals disclosed in Patent Publication No. US 2006/0035793, and specifically one as claimed in any one of claims 1-17 in Patent Publication No. US 2006/0035793), that disperses the hydrocarbons in the sludge into the hydrocarbon diluent and at the same time causes the water and solids to separate. The mixing of the tank bottom sludges, chemical dispersant and hydrocarbon diluent is preferably performed at temperatures between 140 to 200° F. The temperature used in the mixing step is dependent upon the complexity and nature of the tank bottoms to be treated (generally, the higher molecular weight of the hydrocarbons, the higher the temperature). During the mixing step the sludge (paraffin) is transformed by the wax plasticizing and dispersing chemical (preferably Malcera 508MM) from a crystalline to an amorphous form. In the amorphous state the paraffin becomes dispersed and dissolves into the hydrocarbon diluent. Typical diluents that have been used are L.C.O. (light cycle oil), kerosene, diesel, middle distillate, and crude oil.

At these temperatures (140 to 200° F.), the wax plasticizing and dispersing chemical (preferably Malcera 508MM) preferably not only acts as a solubilizing agent, but also acts as a demulsification and antifoaming agent. Concurrently at these temperatures, the water and inorganic solids separate from the mixture of hydrocarbon diluent and sludge tank bottoms and form three phases: Phase One (upper layer), a mixture of hydrocarbons (paraffins) and refined product diluent, Phase Two (middle layer), water layer, and Phase Three (lower layer), suspended inorganic tank bottom sediment (rust, sand, etc.).

Step III (Refer to FIGS. 1 & 2):

The total mixture from the mix tank (Vessel B) is pumped to a standard shale Shaker (Vessel C), for example a linear power shaker available from Fluid Systems Inc.—and specifically designed Weir Box (Vessel D). At a temperature of preferably 160 to 170° F., depending on the type of crude oil tank bottoms (generally, more complex compounds require higher temperatures), the mixture of all three layers is passed through the shale shaker (Vessel C) where the solids are separated from the liquid mixture. The method of the present invention can work with the slurry passing through Vessel C at temperatures as low as about 150 degrees Fahrenheit and as high as about 200 degrees Fahrenheit. After flowing through the shale shaker (Vessel C), the mixture of water and hydrocarbon liquid is passed into a weir box (Vessel D) at preferably 160 to 170° F., where the water is separated from the recovered hydrocarbon and diluent. The method of the present invention can work with the mixture of water and hydrocarbon liquid passing into the weir box (Vessel D) at temperatures as low as about 150 degrees Fahrenheit and as high as about 200 degrees Fahrenheit.

The hot water is separated and pumped into a hot water-steam coiled holding tank (Vessel F). The mixture of recovered paraffin, oil (from the crude oil storage tank (Vessel A)), and refined diluent is pumped from the weir box (Vessel D) to a recovered oil tank (Vessel E), where it is allowed to settle staticly so any residual water and solids can be removed before being tested by the refinery and once accepted is preferably pumped directly to the refinery crude oil charge tank for processing.

From the charge tank the mixture of recovered paraffin, oil, diluent, and crude oil is preferably pumped to the refinery desalter unit, to remove the last traces of water. After treatment in the desalter the crude oil mixture with the recovered hydrocarbons from the tank bottoms are transferred to the refinery processing system for treatment in the various process units.

Case Study

Example 1

In a recent experimental case study, a crude oil tank storage terminal in South Louisiana, on behalf of their customer, put out for a bid a tank cleaning project. The storage tank known as TK-203, has a nominal storage capacity of 160,000 Bbls (189 ft. diameter). The crude oil sludge bottoms in Tank 203 were mainly heavy olefin paraffins, water and sediment. Tank 203 was gauged for the quantity of tank bottom sludge and the quantity of tank bottom sludge in Tank 203 was found to be: 11,311.5 Bbls (2,262 metric tons).

The customer decided upon the tank cleaning and inventory recovery system utilizing Malcera 508MM as the preferred method for cleaning Tank 203. The tank cleaning contractor utilized the following method to clean Tank 203.

Step 1:

The tank bottoms in TK-203 were slurried with hot diluent and pumped into a 440 barrel mix tank. The mix tank was equipped with four 10 hp electric motor operated mixers for mixing the heavy olefin tank bottoms, Malcera 508MM (chemical), and diluent (mixture of kerosene and diesel). The tank bottoms were treated in batches of 280 barrels with 17.5 gallons of Malcera 508MM (1500 P.P.M.-0.15%) and 140 barrels of diluent (kerosene-diesel). The ratio of cutter stock (diluent) to tank bottom sludge can vary from as low as 0.5 to 1.0 or as high as 2.0 to 2.5. The ratio varies according to the complexity of the tank bottom sludge.

The chemical dispersant Malcera 508MM has been used in concentrations ranging from as low as 1,000 P.P.M. (0.1%) to as high as 4,000 P.P.M. (0.4%). The concentration of Malcera 508MM used in treating the tank bottom sludges varies according to the constituents in the tank bottoms to be treated. The key constituents being the type of hydrocarbons, sediment, and the amount of water present in the tank bottoms.

The temperature of the mixture of Heavy Olefin Tank Bottoms, Malcera 508MM, diluent and water was kept at 190 to 200 degrees F. in the mix tank during the mixing process. Each batch was mixed at these temperatures for a period of three to four hours.

Step 2:

At the end of the mixing period, the mixture of Heavy Olefin Tank Bottoms, chemical (Malcera 508MM), diluent (kerosene and diesel), water, and sediment were slowly pumped (at a rate of about 70 GPMs (gallons per minute)) to the standard shale shaker—specially designed Weir Box (Vessels C and D shown in FIG. 2). As the hot liquid mixture from the mix tank is pumped over the shale Shaker Vessel C to separate out the inorganic solid waste from the mix tank, the recovered paraffin and diluent are allowed to flow over the Weir Box where the recovered hydrocarbons and diluent are separated from the water. The temperature in the Weir Box was kept at 160 to 170 degrees F. This allows the water not to vaporize off and keeps the paraffins in the oil layer completely soluble in the diluent hydrocarbon mixture.

After the liquid mixture with the suspended solids passes over the shale shaker, the solids fall into a roll off box Vessel G for disposal. The solids-free liquid mixture flows over the Weir Box Vessel D and separates into two liquid streams. The hot water is separated in the Weir Box Vessel D and pumped to a coiled hot water frac tank Vessel F, where it could be used as a slurry medium to recover bottoms from the storage tank Vessel A for treatment in the inventory recovery system of the present invention. In this specific case study the recovered water was used for the final cleaning of the storage tank Vessel A after the inventory recovery system was completed. The recovered mixture of Heavy Olefin Tank Paraffin Bottoms and diluent were pumped to a recovered oil tank Vessel E where it was pumped down line hot to the refinery charge or holding tank (not shown in the figures) to be mixed with crude oil and sent into the refinery for processing to motor fuels and other refined products.

Final Results of Treatment of Heavy Olefin Tank Bottoms (Paraffin and Oil).

1. Tank bottoms treated: 11,311.5 barrels (2,262 M.T.)
2. Total amount of diluent (Diesel & kerosene blend) supplied by customer: 8,750.5 barrels
3. Recovered heavy olefin paraffin and oil: 10,988.5 barrels (2,198 M.T.)
4. Recovered inorganic solids: 170 barrels (3 roll off boxes)
5. Recovered water: 153 barrels

| B. Chemical analysis of recovered oil | | |
|---|---|---|
| Test | Method | Result |
| Sediment by extraction | ASTM D473 | 0.033 wt % |

Final Results

The final results of this case study indicates how effective the inventory recovery system works in separating the inorganic components, such as rust, sand, etc. from the hydrocarbons and water present in the tank bottoms. The solids content in the recovered oil was reduced by greater than 99.98 percent resulting in a solids-free oil paraffin product (see Tables 1 and 2) that could be blended with fresh crude oil and pumped downline to the refinery for processing. The recovered water had a pH of 6.96 and was pumped over to the refinery water treatment system for final processing. The recovered hydrocarbon material was processed through the refinery in a normal way with no reported issues with the catalyst, desalter, or other process equipment.

Economics of Inventory Recovery System

1. Cost for treating the heavy olefin tank bottoms in Tank 203 with the Inventory Recovery system of the present invention and Malcera 508MM: $675K (includes labor, energy, equipment utilization, and chemicals).

This calculates out to a cost of $60.00/Bbl ($298.00/metric ton) of tank bottoms treated:

2. Total time to complete job (including 10 days to mobilize and demobilize): 35 days.

3. Comparing the economic benefits of the Treatment and Inventory Recovery System utilizing Malcera 508MM with conventional tank bottom sludge removal and disposal:

A.) The removal of 11,311.5 barrels (2,262 M.T.) of heavy olefin paraffin tank bottoms to an environmentally approved waste site cost $450/M.T. plus transportation and containment costs or $1,004,220.00 (after removal of water).

B.) Treatment and recovery of the heavy olefin paraffin tank bottoms with the system and Malcera 508MM cost $675,000 and the refinery received 10,988.5 barrels of processable feedstock. If the refinery puts the value of the recovered paraffin at $40/barrel, the refinery would recover $439,540 worth of crude oil for processing. Therefore the overall cost of cleaning Tank 203 to the refinery was $235,460. The overall savings to the refinery is $1,004,220.00 plus containment and transportation and the added value of the refinery products made from the recovered 10,988.5 barrels of paraffin tank bottoms.

| Cost comparison of the two methods described in the economic analysis: | | |
|---|---|---|
| Method | Cost | Recovered Credit |
| I. Waste Disposal | $1,004,220.00 + Transportation + Containment | 0.00 |
| II. Waste Minimization Program with Malcera 508MM | $675,000 | a.) $439,540 recovered as crude feedstock or b.) $315,000 as energy value |

TABLE 1

Chemical analysis of Heavy Olefin Tank Bottoms*
TK-203 Tank Bottoms

| Test | Method | Result |
|---|---|---|
| Sediment by extraction | ASTM D473 | 2.068 wt % |

*chemical analyses were performed by S.G.S. Oil and Gas Labs, St. Rose, Louisiana.

TABLE 2

Chemical analysis of recovered oil

| Test | Method | Result |
|---|---|---|
| Sediment by extraction | ASTM D473 | 0.033 wt % |

Example 2

Conventional Tank Cleaning Project

Estimate
Estimated costs to remove and clean 212 foot diameter crude oil tank containing 21,000 barrels heavy Paraffin=$900,000.00
21,000 barrels divided by 4.8 barrels per cubic yard=4,375 cubic yards×$500 per cubic yard (ton)=$2,187,500.00 (if sent out as hazardous waste)
21,000 barrels divided by 4.8 barrels per cubic yard=4,375 cubic yards divided by 12 cubic yards per box=365 boxes
Transportation to disposal—365 boxes×$350.00 per box=$127,750.00
Transportation of boxes to job site—10 boxes×$300.00 per box=$3,000.00
Transportation of boxes to washout facility and return to vendor—10 boxes×$350.00=$3,500.00
Box Rental—10 boxes×$45.00 per box per day=$450.00 per day×40 days=$18,000.00
Box Washout—10 boxes×$450.00=$4,500.00
Total Cost of Cleaning & Disposal: $3,244,250.00
Loss of inventory: $1,014,450.00
Loss of revenue due to loss of inventory: $1,166,618.00
Estimated Total Cost: $5,425,318.00
Actual Inventory Recovery System Project
1. Actual results from a recent project (212 foot diameter crude oil storage tank) containing an estimated 21,000 barrels of heavy Paraffin bottoms:
Recovered Hydrocarbons=20,289 barrels
Inorganic sand and rust (44 cubic yards)=211 barrels
Water=500 barrels
2. Cost to remove tank bottoms and clean a storage tank is a given, regardless of what is done with the bottoms. Estimated cost of this project is about $900,000.00.
3. Savings realized by utilizing this New Inventory Recovery System is as follows:
20,289 barrels of recovered inventory×$50.00 per barrel=$1,014,450.00
Cost for disposal of 44 cubic yards×$500.00 per cubic yards=$22,000.00
Transportation of boxes to job site—3 boxes×$300.00 per box=$900.00
Transportation to disposal—3 boxes×$350.00 per box=$1,050.00
Transportation of boxes to washout facility and return to vendor—3 boxes×$350.00=$1,050.00
Box Rental—3 boxes×$45.00 per box per day=$135.00 per day×40 days=$5,400.00
Box Washout—3 boxes×$450.00=$1,350.00
Revenue realized by the refined products from the 20,289 barrels of crude oil=$1,014,450.00×1.15=$1,166,618.00
Water—500 barrels to be treated in customer's water treatment system at minimal cost.
Total Cost: $931,750.00
This example illustrates how much money can be saved by using the present invention instead of prior art disposal methods.

The paraffin modifier (also referred to herein as a wax plasticizing and dispersing chemical) used in the present invention can comprise a composition for reducing the viscosity of petroleum paraffin wax and/or asphaltenes found in petroleum, the composition comprising a blend of:

(a) a plasticizing agent for plasticing wax or asphaltenes;

(b) a solubilizing agent for solubilizing wax or asphaltenes; and (c) a surface active agent capable of reducing the surface tension of the blend to an interfacial surface tension of less than 20 dynes per $cm^2$. The plasticizing agent is preferably tributoxyethylphosphate (KP-140). Preferably, the solubilizing agent is selected from the group consisting of: crude oil, petroleum distillates, turpentine, pine oil, gas-to-liquid fuels (G.T.L.), vegetable oil, fatty acids, a blend of fatty acids, esterified fatty acids, amidified fatty acids, turpentine, pine oil, glycol ethers, and n-methyl-2-pyrrolidone aka M-PY-ROL (in which case the petroleum distillate is preferably selected from the group consisting of: diesel, light cycle oil, lube base oil, mineral oil, vacuum gas oil, middle distillate, kerosene, crude oil tank bottoms, asphalt crude oil, naphtha, and fuel oil, and the vegetable oil is preferably selected from the group consisting of: castor oil, coconut oil, corn oil, cottonseed oil, linseed oil, oiticica oil, olive oil, peanut oil, perilla oil, rapeseed oil, safflower oil, soybean oil, sunflower oil, and tung oil). Preferably, the surface active agent is selected from the group consisting of nonionic ethoxylated alcohols surfactant (HLB ranging from about 10.0 to about 15.0), nonionic fluorosurfactants (HLB ranging from about 10.0 to about 13.0), and nonionic phosphate ester surfactants (HLB ranging from about 6.0 to about 10.0). More preferably, the solubilizing agent comprises fatty acids and the surface active agent comprises a mixture of a nonionic ethoxylated alcohol surfactant (HLB ranging from about 10.0 to about 15.0), a nonionic fluoroalcohol surfactant (HLB ranging from about 10.0 to about 13.0), and a nonionic phosphate ester surfactant (HLB ranging from about 6.0 to about 10.0).

A basic method similar to that disclosed herein has been practiced for some years by the inventor (see FIG. 3 of U.S. Provisional Patent Application Ser. No. 61/352,218, filed 7 Jun. 2010, and incorporated herein by reference, which shows the inventor's prior art system). However, only recently did the present inventor predict that the method would work better with a wax plasticizing and dispersing chemical such as Malcera 508MM Paraffin Modifier. After some experimentation, the present inventor modified his old method to use Malcera 508MM Paraffin Modifier (or generic equivalent) where no chemicals were used in the past. Other modifications include changing the flow from going directly from the crude oil storage tank (Vessel A) to a Roll Off Box (Vessel G), then to shale shaker (Vessel C). The current invention adds the use of 420 barrel coiled Mix Tanks (Vessel B) and containment for cutter (Vessel H) which is usually a 500 barrel Frac Tank. This enables the inventor to add diluent and control the addition of chemicals and heat to maintain ratios needed to obtain desired results. Also, modifications to the weir box (Vessel D) include adding steam coils to Compartment 1 (six passes at about a foot from the bottom and six passes about a foot above that) to maintain appropriate temperature so three phase separation can be obtained. There were in the old method and still are one-inch steam coils across the bottoms of compartment #2 and #3 (Vessel D) (they are about two inches above the bottom).

The 44 pages of PowerPoint slides attached to my U.S. Provisional Patent Application Ser. No. 61/352,218, filed 7 Jun. 2010, and incorporated herein by reference, show apparatus which can be used to perform a preferred method of the present invention.

The hydraulic bobcat shown in slide 29 of the attached 44-page PowerPoint paper is a regular T52 Bobcat converted from diesel driven to hydraulic driven (so that it can be safely used without a danger of fire from combustion of the diesel). It is another tool to assist in getting the tank bottoms out of the Crude Oil Storage tank (Vessel A) to enable bottoms with slurry to be pumped to Mix Tanks (Vessel B). It is not often required, but is effective when used.

The 15 pages of PowerPoint slides attached to my U.S. Provisional Patent Application Ser. No. 61/185,114 show various details of the present invention. Those 15 pages and my U.S. Provisional Patent Application Ser. No. 61/185,114 are incorporated herein by reference.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method for treating crude oil and refined products tank bottoms containing paraffin, comprising the following steps:
   a. moving tank bottom sludge out of a crude oil tank or refined products tank and into a mix tank, and mixing the sludge with a hydrocarbon diluent to create a first mixture;
   b. treating the mixture in the mix tank with a paraffin modifier chemical to create a second mixture;
   c. heating the second mixture in the mix tank to a predetermined temperature, so that the paraffin in the second mixture is transformed by the paraffin modifier chemical to an amorphous form;
   d. moving the second mixture from the mix tank to a shale-shaker at a second predetermined temperature to separate solids in the second mixture from the fluids in the second mixture to create a third mixture comprising the fluids;
   e. moving the third mixture which comprises recovered hydrocarbons and water to a weir box to separate the water from the recovered hydrocarbons;
   f. moving the recovered hydrocarbons from the weir box to a recovery oil tank.

2. The method of claim 1, further comprising moving the recovered hydrocarbons from the recovery oil tank to a refinery crude oil charge tank for processing.

3. The method of claim 2, wherein before the recovered hydrocarbons are moved from the recovery oil tank to an oil refinery, the recovered hydrocarbons are tested by the refinery.

4. The method of claim 2, wherein following the moving of the recovered hydrocarbons to the charge tank, the recovered hydrocarbons are moved to a refinery desalter unit to remove any last traces of water.

5. The method of claim 4, wherein the next step comprises transferring the recovered hydrocarbons to a refinery processing system for treatment in various process units.

6. The method of claim 1, wherein the temperature in step "c" is between 140 and 200 F.

7. The method of claim 1, wherein the sludge comprises primarily paraffin.

8. The method of claim 7, wherein the chemical transforms the paraffin from a crystalline form to the amorphous form so that the paraffin will disperse and dissolve into the hydrocarbon diluent.

9. The method of claim 8, wherein the diluent is selected from a group consisting of light cycle oil, kerosene, diesel, middle distillate, and crude oil, and combinations thereof.

10. The method of claim 1, wherein the third mixture also includes inorganic solids, and in the weir box, the water and inorganic solids separate from the hydrocarbons to form three phases.

11. The method of claim 10, wherein the three phases comprise an upper mixture of paraffin and hydrocarbon diluent, a middle phase of water, and a lower phase of suspended inorganic tank bottom sediment.

12. The method of claim 11, wherein suspended inorganic tank bottom sediment comprises rust and sand.

13. The method of claim 1, wherein the second predetermined temperature of step "d" is between about 160 and 170 F.

14. The method of claim 1, wherein the water separated in step "e" is moved to a hot water-steam coiled holding tank.

15. The method of claim 1, wherein the sludge is moved out of the crude oil tank or refined products tank and into the mix tank by moving the mixture of sludge and hydrocarbon diluent out of the tank as a slurry.

16. The method of claim 15, wherein the paraffin modifier chemical comprises a substantially non-aqueous composition for reducing the viscosity of petroleum paraffin wax and/or asphaltenes found in petroleum, the composition comprising a blend of: (a) a plasticizing agent for plasticing wax or asphaltenes; (b) a solubilizing agent for solubilizing wax or asphaltenes; and (c) a surface active agent capable of reducing the surface tension of the blend to an interfacial surface tension of less than 20 dynes per $cm^2$.

17. The method of claim 1, wherein the paraffin modifier chemical comprises a substantially non-aqueous composition for reducing the viscosity of petroleum paraffin wax and/or asphaltenes found in petroleum, the composition comprising a blend of: (a) a plasticizing agent for plasticing wax or asphaltenes; (b) a solubilizing agent for solubilizing wax or asphaltenes; and (c) a surface active agent capable of reducing the surface tension of the blend to an interfacial surface tension of less than 20 dynes per $cm^2$.

18. A method for treating crude oil and refined products tank bottoms containing paraffin, comprising the following steps:

a. moving tank bottom sludge out of a crude oil tank or refined products tank and into a mix tank, and mixing the sludge with a hydrocarbon diluent to create a first mixture;
b. treating the first mixture in the mix tank with a paraffin modifier chemical to create a second mixture;
c. heating the second mixture in the mix tank to a predetermined temperature, so that the paraffin in the second mixture is transformed by the paraffin modifier chemical to an amorphous form;
d. moving the second mixture from the mix tank to a shale-shaker at a second predetermined temperature to separate solids in the second mixture from the fluids in the second mixture to create a third mixture comprising the fluids; and
e. passing the third mixture which comprise recovered hydrocarbons and water to a weir box to separate the water from the recovered hydrocarbons.

19. A method for treating crude oil and refined products tank bottoms containing paraffin, comprising the following steps:
  a. sampling tank bottom sludge in a crude oil tank or refined products tank to determine its characteristics;
  b. moving tank bottom sludge out of the crude oil tank or refined products tank and into a mix tank, and mixing the sludge with a hydrocarbon diluent to create a first mixture;
  c. treating the first mixture in the mix tank with a paraffin modifier chemical to create a second mixture;
  d. heating the second mixture in the mix tank to a predetermined temperature, so that the paraffin in the second mixture is transformed by the paraffin modifier chemical to an amorphous form;
  e. moving the second mixture from the mix tank to a shale-shaker at a second predetermined temperature to separate solids in second the mixture from the fluids in the second mixture to create a third mixture comprising the fluids;
  f. moving the third mixture which comprise recovered hydrocarbons and water to a weir box to separate the water from the recovered hydrocarbons.

20. The method of claim 19, further comprising the step of moving the recovered hydrocarbons from the weir box to a recovery oil tank.

* * * * *